UNITED STATES PATENT OFFICE.

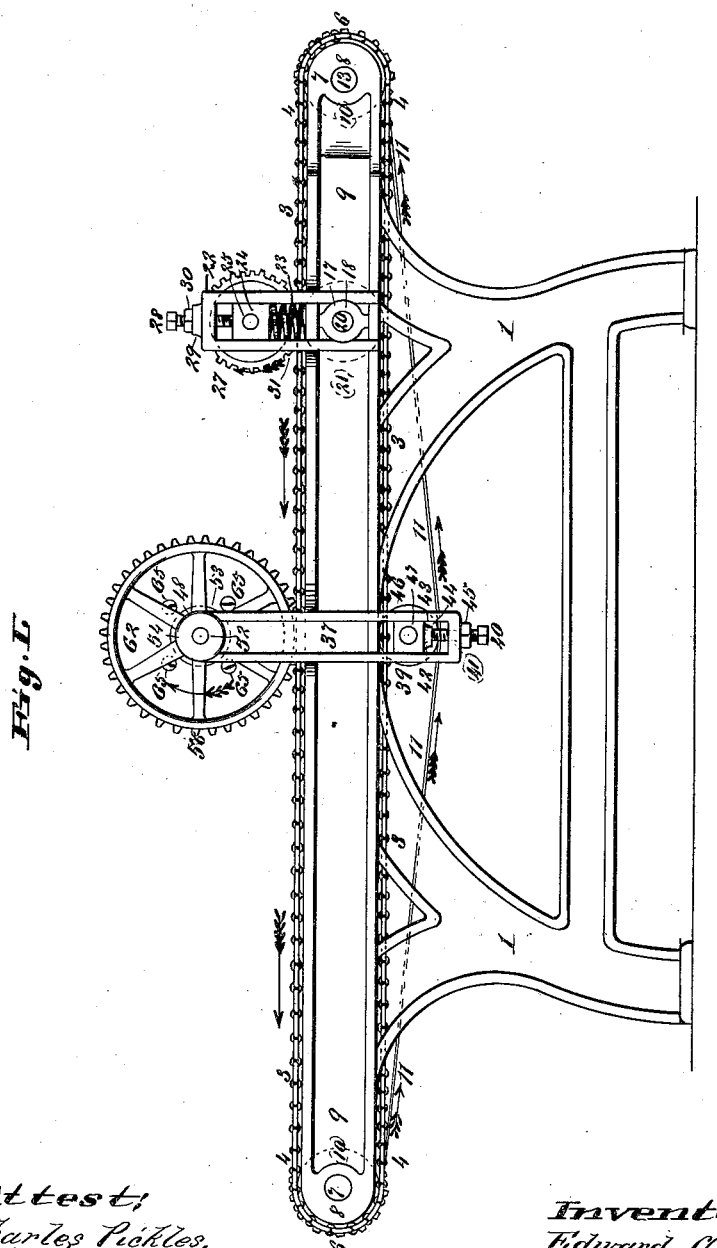

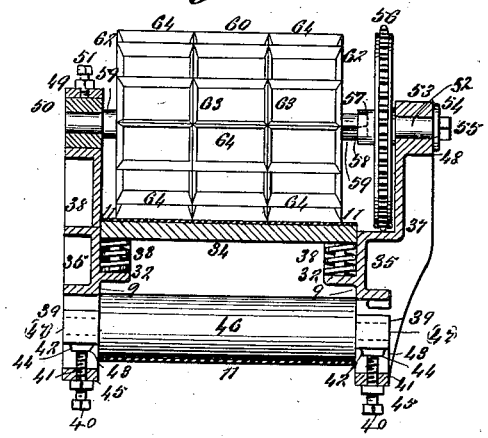

EDWARD A. C. PETERSEN, OF CHICAGO, ILLINOIS.

REVOLVING DOUGH-DIVIDER.

SPECIFICATION forming part of Letters Patent No. 475,607, dated May 24, 1892.

Application filed January 16, 1892. Serial No. 418,321. (No model.)

*To all whom it may concern:*

Be it known that I, EDWARD A. C. PETERSEN, of the city of Chicago, in the county of Cook and State of Illinois, have invented a certain new and useful Improvement in Revolving Dough-Dividers, of which the following is a full, clear, and exact description, reference being had to the accompanying drawings, forming part of this specification.

This invention relates to a machine dough-cutter, in which the dough is carried on an endless rotary apron under a breaking or equalizing spring-roll that makes it of a uniform thickness and over a yielding spring-table, where it is divided into cakes by a rotary cutter, the conformation of whose knives and their relative adjustment determines the shape and size of said cakes; and the invention consists in features of novelty hereinafter fully described, and pointed out in the claims.

Figure I is a side elevation with the crank and drive pulley removed and shows the dough-table, the endless chain that engages with the spur-wheels that respectively turn the breaking-rollers and the rotary cutter, and the means for adjusting the tension of the endless rotary apron. Fig. II is a vertical transverse section taken on line II II, Fig. IV, showing the tension-roll and means of adjustment, the yielding spring-table, and the rotary cutter. Fig. III is a vertical section taken on line III III, Fig. IV, showing the breaking or equalizing rolls and their means of support. Fig. IV is a detail top view of the driving end of the machine, showing the driving mechanism, the breaking-rolls, and the rotary cutter; and Fig. V is a detail vertical longitudinal section taken on line V V, Fig. IV, showing the apron and means for effecting its tension, with end views of the rollers, the spring-mounted yielding table, and the rotary cutter.

Referring to the drawings, 1 represents the frame that supports the main table 2, on which the dough is forwarded, rolled, and cut.

3 represents an endless chain, whose links 4 engage in the projecting pins or sprocket-cogs of the two sprocket-wheels 6 at each end, respectively, of the main table, and which sprocket-wheels are each respectively mounted on the roller shafts 7, whose journals have their respective bearings 8 in the side top frames 9 of said table.

10 represents the two friction-rollers, which are fast mounted on their respective shafts 7, and on which rollers is mounted the endless revolving apron 11, that carries the dough.

12 represents a bracket-bearer arm that projects laterally from near one end of one of the side top frames on the same side as that on which the sprocket-gear works, and in which is located the bearing 8, in which at said corner of the side frames of the table-top the elongated journal 13 of that one of the roller-shafts 7 has its bearing.

14 represents a crank-handle, which is fast mounted on the projecting end of said elongated journal for operating the machine when hand-power is used.

15 represents an extension of the same roller-shaft 7, that carries the crank-handle at the reverse end of said shaft beyond the journal and its bearings, on which extension is fast mounted the pulley-wheel 16, by which the machine is driven when steam or other than hand-power is used.

17 represents perforate bearings at near the driver end of the main table in an outwardly-projecting journal-box 18 on that one of the side top frames that carries the sprocket-chain gear, and in the non-projecting journal-box 19 in the opposite side top frame, in which bearings 17 are mounted the journals of the shaft 20, on which shaft is fast mounted the lower breaking or equalizing roller 21, which lower roller, as shown and above described, has stationary bearings.

22 represents two vertical rectangular frame-pedestals, which rise, respectively, from said side top frames on either side above the journals of said roller-shaft, and 23 are spiral springs, which are respectively mounted on said side frames of the main table within said frame-pedestals.

24 represents rectangular journal-bearer blocks, which blocks rest on said springs within said vertical frames 22 and have a sliding adjustment therein.

25 is a roller-shaft, whose journals are mounted in the bearings 26 in said spring-mounted adjustable blocks, and 27 is the upper breaking or equalizing roller, which is mounted on the shaft 25.

28 represents set-screws that are screw-seated in the turrets 29 in the top of the vertical frames 22, and which set-screws are adjustable to change the elevation of the bearer-blocks 24 on their spring-mounts, and consequently the degree of elevation of the upper breaking-roller 27 above the lower one 21. Jam-nuts 30 lock the set of the adjusted set-screws 28. The revolving apron 11, that carries the dough, is upheld and aided on its journey by said lower roller, and said set-screws having been rightly adjusted the required thickness to which said breaking-rollers equalize the cake-dough is regulated.

31 represents a sprocket-wheel, which is fast mounted on the roller shaft 25 directly over and in engagement with the sprocket-chain 3, so that as said chain revolves and said sprocket-wheel engages therewith the breaking-roller 27 has conveyed to it a positive movement and its associate breaking-roller 21 a contingent movement. The teeth of said sprocket-wheel 31 are made longer than usual, so as to not slip their engagement with the links of the chain 3 when said breaking-roller 27 is elevated for working a heavy thickness of dough.

32 represents box-flanged beds that project downwardly from the top of the main table, in each corner of which box-frames on each side of the table is respectively placed a spiral spring 33.

34 represents a yielding cutter-table, which sits and works within said boxed beds 32 and rests on said spiral springs 33, the pendent legs 35 of which table pass downward through the center of the spiral springs and through the perforations 36 in the bottom of said flanged beds. The said yielding table is upheld by said spiral springs in immediate contact with and beneath the revolving apron 11, that carries the dough.

37 represents a laterally-projecting and both pendent and vertically-surmounting journal-box bearer and box-flanged frame, which is integral with the side top frame 9, that is on the sprocket-chain-gear side of the table, and 38 is a both pendent and vertically-surmounting journal-bearer and box-flanged frame integral with the side top frame 9 at the opposite side of the table to the frame 37.

39 represents vertically-adjustable journal-bearer blocks, which are held captive and adjusted by the set-screws 40 within the box-flanged pendent ends of said frames 37 and 38, which set-screws respectively pass through perforations 41 in the bottoms of the frames 37 and 38, and the rivet-heads 42 of said screws are held and turn in the concave recesses 43 of the moorage-washers 44, which washers are secured to the bottoms of said bearing-blocks 39. Jam-nuts 45 on said set-screws lock their adjustment.

46 represents a tension-roller, the journals of whose shaft 47 are mounted in the bearings of the said adjustable sliding blocks 39. The said tension-roller 46 (see Figs. I, II, and V) exerts tension on the revolving apron 11, so as to tighten the same on the friction-rollers 10, so as to insure the movement of said apron with the dough to be operated on when the drive-shaft 7, that carries the initial one of said two rolls, is driven by the pulley 16 or hand-crank 14. As said set-screws holds the bearing-blocks captive, the withdraw turning of the screws draws down the roller, and thus tightens the tension on the apron. The projecting surmounting end of said journal-box bearer-frame 37 is capped by an integral journal-box 48, and within a rectangular boxing immediately beneath the summit 49 of the opposite surmounting journal-box bearer-frame 38 is seated the rectangular journal-bearer block 50, whose journal-bearing is on a line with the journal-bearing of the integral journal-box 48, that caps the coadjutory bearer-frame 37. A set-screw 51, which is screw-seated in the summit 49 of the journal-box bearer-frame 38 when tightened, holds the journal-bearer block 50 to its seat.

52 represents a short shaft, whose journal is mounted in the bearing of the integral journal-box 48, and the stay-shoulder washer 53, which is mounted on the inside of said journal, works home against the inside face of said journal-box, and with the aid of the washer-collar 54 on the outer end of said journal when the screw-nut 55 is seated thereon keeps the journal true to its bearing.

56 represents a large sprocket-wheel, which is fast mounted on the short journal-shaft 52 close home against the shoulder-washer 53, which washer both holds said sprocket-wheel from swerving from its true course and as an intervening spacer prevents said wheel in its rotary movement from interfering with its supporting-frame 37.

57 represents an integral hub or boss enlargement of the inner end of the short journal-shaft 52, against the shoulder of which hub the center of said sprocket-wheel 56 is fast seated. The said hub-like enlargement of the shaft is provided with a square countersink-box 58, in which the square countersunk end of the shaft 59 is fast seated. The round journal end of said shaft is mounted and works in the center bearing of the aforesaid journal-block 50.

60 represents the cutter-wheel, which is mounted on said shaft 59 and which is constructed as follows: A hub-cylinder 61, that extends the length of said cutter-wheel, is fast-mounted on said shaft 59. End disk cutters 62 and intermediate ring cutters 63 are set up, said end disk cutters 62 against the ends of said hub-cylinder and the intermediate ring cutters 63 at equidistant positions around said cylinder. 64 represents radial sectional knives, whose butts are secured in the countersink-channel grooves 66 in the periphery of the hub-cylinder, and the ends of said radial sectional knives jam closely against the respective sides of the end disk and intervening cutters, as the case may be, thus making four circular cutters and three series of radial sectional cutters. 65 represents tie screw-rods which are seated in perforations in the end disk cutters 62 and pass through perforate lugs 67, which are integral with said hub-cylinder 61, from which they project inwardly. After the placing in position of said circular and radial knives and the insertion of said screw tie-rods the said rods are screwed home either in screw-seats in the final disk through which they pass, or screw-nuts may be seated in their projecting ends, and said tie-rods are thus made to draw all the cutters (both circular and radial) in firm attachment together and to the hub-cylinder 61 and shaft 59. As the sprocket-teeth on the periphery of the large sprocket-wheel 56 engage with the links 4 of the endless chain 3 when the machine, and consequently said chain, is in motion, the cutter-wheel is governed by the movement of said sprocket-wheel and is made to rotate.

I do not confine myself to the number and respective positions of the circular and radial sectional knives 62 and 63 and recessed grooves 66 of the rotary cutter-wheel or to the configuration of the knife cuts, for the number of each may be increased or diminished, and thereby change the shape of the cakes cut, and also knives of any desired form or figure may be secured to said rotary cutter-wheel, and thus change the configuration of the cakes cut.

The operation of the device is as follows: The revolving apron, which is preferably slackened when the machine is out of use by relaxing the draw of the set-screws 40, and thus elevating the captive tension-roller 46, has the tension again applied to it by the return draw of said set-screws and pressure of said rollers until said apron is sufficiently taut. When, however, the apron is contracted or the tension still further increased by the reception thereof of moisture from the dough it carries, the said undue additional tension may be reduced by the relief-turn of said set-screw. The breaking-rollers are adjusted, as specified, to the required thickness of the cakes to be cut, and the rotary cutter-wheel (of which there may be several with diverse complements of knives, as specified) is selected and placed in working position, the apron being turned on its revolving course by the drive action of either the power-pulley 16 or the hand-lever 14. The dough to be operated on is then placed on said revolving apron at the initial drive end of the main table of the machine, and the dough, with said apron, is carried by the combined roller and sprocket gear action of the machine between the breaking-rollers, which equalize the thickness of the dough and with machine precision rolls it to the required thickness, (to which said rollers have been adjusted.) The revolving apron still traveling forward in the direction shown by arrows in Figs. I, IV, and V, the now evenly-rolled dough approaches and passes under the rotary cutter-wheel 60, by which the operation is completed and the now both rolled and cut cakes are forwarded by the revolving apron to its discharge end onto the trays ready for insertion in the oven.

I claim as my invention—

1. In a revolving dough-divider, the main table 2, the rollers 10, mounted in the ends of the table, and the endless apron 11, mounted on said rollers, in combination with adjustable breaking-rollers 21 and 27, and the rotary cutting-wheel 60, all arranged between the ends of said apron, breaking-roller 27 and cutting-wheel 60 being located above the top of the apron, and breaking-roller 21 being arranged below the top thereof, whereby the same is upheld under said roller 27, substantially as and for the purpose set forth.

2. In a revolving dough-divider, the combination of the main table that supports the device, the friction-rolls that run in bearings at the ends of said table, the revolving apron mounted on said rollers, the adjustable journal-bearer blocks 39, the moorage-washers 44, secured to said blocks, the set-screws 40, that hold said bearer-blocks captive and adjust the same, the shaft 47, that journals in said bearer-blocks, and the tension-roller 46, that applies tension to said apron, substantially as described.

3. In a revolving dough-divider, the combination of the main table that supports the device, said table having the side top frames 9, the rollers 7, journaled in the ends of said table, the adjustable tension-roller 46, that tightens said apron, the frame-pedestals 22, secured to said side top frames, the shaft 20, journaled in said side frames, the lower breaking-roller 21, mounted on said shaft, the spiral springs 23, mounted in said pedestal-frames, the bearer-blocks 24, mounted on said springs, the shaft 25, mounted in said blocks, the upper breaking-roller 27, mounted on said shaft, and the set-screws 28, that adjust said roller 27 to the required thickness of the rolled dough, substantially as described.

4. In a revolving dough-divider, the combination of the side top frames 9, the journal-box bearer-frame 37, the journal-box bearer-frame 38, the said frames respectively attached to said side frames 9, the captive adjustable bearer-blocks 39, that are housed and slide in said frames, the moorage-washers secured to said blocks, the set-screws that hold said blocks captive and adjust the same, and the cutter-wheel 60, that journals in said frames 37 and 38, substantially as described.

5. In a revolving dough-divider, the combination of the side top frames 9 of the main table, the journal-box bearer-frame 37, having the surmounting journal-box 48, the short journal-shaft 52, mounted in said journal-box and having the boss-hub 57 on its inner end, the said boss-hub being provided with the countersunk box 58, the journal-box bearer-frame 38, the journal-block 50, housed in said frame, the set-screw 51, that fastens said block in said frame, the cutter-wheel shaft 59, whose inner end is rigidly held in said countersunk box 58 in the short journal-shaft 52 and whose journal end is mounted in said block 50, and the rotary cutter-wheel mounted on said shaft 59, substantially as described.

6. In a revolving dough-divider, the combination of the journal-box bearer-frames 37 and 38, the union-shafts 52 and 59, mounted in said frames, the hub-cylinder 61, mounted on said shaft 59, the said hub-cylinder provided with the channel-grooves 66 and the perforate lugs 67, the end disk cutters 62, the intermediate ring cutters 63, the sectional radial cutters 64, and the tie-bolts 65, which tie-bolts secure together and to said shaft 59 the constituent parts of the cutter-wheel 60, substantially as described.

7. In a revolving dough-divider, the combination of the side top frames 9, the roller-shafts 7, mounted in journal-bearings in near the ends of said frames, the rollers 10, mounted on said shafts, the revolving apron mounted on said rollers, the power-pulley 16 and the hand-crank 14, mounted on one of said shafts, the sprocket-wheels 6, fast mounted on said shafts, and the endless chain 3, mounted on said sprocket-wheels, substantially as described.

8. In a revolving dough-divider, the combination of the side top frames 9, the pedestal-frames 22, the spiral springs 23, mounted in said frames, the bearer-blocks 24, mounted on said springs, the set-screws 28, that adjust and set said blocks, the roller and sprocket-wheel-bearer shaft 25, mounted in said blocks, the breaking-roller 27, mounted on said shaft, the sprocket-wheel 31, mounted on said shaft, and the endless revolving chain 3, which engages with said sprocket-wheel to turn the same and to turn the breaking-roller 27, substantially as described.

9. In a revolving dough-divider, the combination of the main table 2, having the side frames 9, the journal-box bearer-frames 37 and 38, integral with said side frames, the union-shafts 52 and 59, journaled in said pedestal-frames, the rotary cutter-wheel mounted on said shaft 59, the large sprocket-wheel mounted on said shaft 52, and the endless revolving sprocket-chain that engages with said sprocket-wheel and turns said cutter-wheel, substantially as described.

10. In a revolving dough-divider, the combination of the main table having the side frames 9, the pedestal-frames 22, the roller-shafts 7, mounted in said side frames, the rollers 10, mounted on said shafts, the revolving apron mounted on said rollers, the power-pulley 16 and hand-crank 14, mounted on one of said shafts, the sprocket-wheels 6, mounted on said shafts, the revolving endless chain that engages with said sprocket-wheels, the breaking-roller 21, journaled in said side frames, the spiral springs 23, mounted in said pedestal-frames, the adjustable bearer-block 24, mounted on said springs, the set-screws 28, that adjust said block, the roller-shaft 25, journaled in said blocks, the upper breaking-roller 27, mounted on said shaft, the sprocket-wheels 31, that engage with said revolving chain 3, the pedestal-frames 37 and 38, the union-shafts 52 and 59, journaled in said pedestal-frames, the rotary cutter-wheel mounted on said shaft 59, and the large sprocket-wheel 31, mounted on said shaft 52 and that is engaged and turned by said revolving chain 3, substantially as described.

11. In a revolving dough-divider, the combination of the main table 2, having the side frames 9, the box-flanged beds 32, that are countersunk from the top of said table, the spiral springs 33, that are seated in said beds, the yielding cutter-table 34, that rests on said springs, and the pendent legs from said table that pass through said springs and through perforations in said bed-bottom, substantially as described.

12. In a revolving dough-divider, the combination of the main table 2, having the side frames 9, the roller-shafts 7, the rollers mounted on said shafts, the power-pulley 16, and the crank-handle 14, mounted on one of said shafts, the revolving apron 11, that is mounted on said rollers and carries the dough, the breaker-rollers between which the dough passes, the rotary cutter-wheel that divides said dough, and the spring-yielding cutter-table beneath said cutter-wheel, substantially as described.

EDWARD A. C. PETERSEN.

In presence of—
   JOHN C. DETHKE,
   ROBERT DETHKE.